United States Patent [19]

Christ

[11] 3,708,885
[45] Jan. 9, 1973

[54] APPARATUS FOR MEASURING SHAFT SEALING RINGS HAVING AN ANNULAR SEALING LIP

[75] Inventor: Karl Christ, D-5673 Burscheid, Germany

[73] Assignee: Goetzewerke Friedrich Goetze A.G., Burscheid, Germany

[22] Filed: April 1, 1971

[21] Appl. No.: 130,377

[30] Foreign Application Priority Data

April 7, 1970 Germany.....................P 20 16 436.7
Aug. 29, 1970 Germany.....................P 20 43 011.9

[52] U.S. Cl................33/174 L, 33/174 Q, 33/181 R
[51] Int. Cl..............................................G01b 5/00
[58] Field of Search.........................33/174 Q, 174 L

[56] References Cited

UNITED STATES PATENTS

| | | | |
|---|---|---|---|
| 2,408,689 | 10/1946 | Seme | 33/174 Q |
| 3,040,436 | 6/1962 | Eisele | 33/174 Q |
| 3,073,033 | 1/1963 | Dega | 33/174 Q |
| 3,296,705 | 1/1967 | Johnson | 33/174 Q |
| 3,538,610 | 11/1970 | Zwicker et al. | 33/174 Q X |
| 3,543,407 | 12/1970 | Dega | 33/174 Q X |

FOREIGN PATENTS OR APPLICATIONS 1,050,474 12/1966 Great Britain.....................33/174 Q Primary Examiner—Robert B. Hull
Attorney—Spencer & Kaye

[57] ABSTRACT

Apparatus for determining axial and radial dimensions of annular lip seals usable on shaft members, including a support structure for rotatably supporting a spindle over which a seal can be slipped, the prong having a circumferential groove shaped to conform to the contour of the sealing lip of the seal and the diameter of the bottom of this groove being equal to the diameter of the shaft for which the seal is designed. When the seal is slipped over the spindle the sealing lip snaps into the groove to assume a position as if mounted on a shaft for expected use. In this position calibrated gauges mounted on the support structure and having sensor portions adapted to contact face portions on the seal can be used to make the desired measurements.

11 Claims, 3 Drawing Figures

Inventor
Karl Christ

Inventor

Karl Christ

By  Spencer & Kaye

Attorneys.

APPARATUS FOR MEASURING SHAFT SEALING RINGS HAVING AN ANNULAR SEALING LIP

BACKGROUND OF THE INVENTION

The present invention relates to an apparatus for measuring the sealing edge spacing and the effective spacing of the spring in radial shaft sealing rings. In the manufacture of the sealing lips of molded radial shaft sealing rings, for example, or valve stem seals, the parts are machine finished in the region of the sealing edge to remove, on the one hand, the hard pressing skin along the sealing edge and, on the other hand, to produce a properly fitting, faultfree sealing edge at the sealing lips. This additional work is often done by grinding of the frontal contact surface of the sealing lip. The end position of the sealing edge is therefore dependent upon the degree of grinding. The ratio of the position of the radially inwardly disposed sealing edge to the spring enclosing the sealing lip on the outside is decisive for achieving the desired rotational behavior. A direct measurement of this ratio has thus far not been possible Since the groove formed in the sealing lip to hold the spring constitutes a fixed dimension, indirect measurement of the distance of the sealing edge from a reference surface or plane can be used to determine the position of the sealing edge with respect to the center of the spring. The indirect measurement of the distance of the effective lines of the spring from the sealing edge in spring-tensioned lip seals can be accomplished with a known device in which a spindle is provided with an axial abutment. The seal is placed thereon so that the sealing lip edge is fixed at the axial abutment and the distance of the spring groove from a fixed reference plane, for example from the frontal side of the spindle, can be measured.

A further known testing device consists of a plexiglas ring serving as the testing spindle which has an outer axial abutment. This is disclosed in AWDR Standard IV A 4, Sheet 1, that is, the standards of the German Arbeitsgemeinschaft fur Wellendichtringe (Working Group for Shaft Sealing Rings). On the outer peripheral surface of the testing spindle two markings in the form of wedge-type notches with or without a color insert are applied at the appropriate distances. The spacing of the wedge-type notches corresponds to the permissible tolerance field in which the sealing edge of the lip seal may lie. After placing the seal onto the testing spindle it is possible, by looking at an angle from the inside to the outside, to determine, but not measure, the position of the sealing edge with respect to the two markings.

According to a further proposal, the known notch markers are replaced by contact devices which define the limits of the permissible tolerance field for the position of the sealing edge of a shaft sealing ring placed on a spindle having the rated shaft diameter. This permitted a selection according to quality and rejected material, but it was not possible to determine the exact dimensions of the edge of the sealing lip with respect to the radial effective plane of the spring.

SUMMARY OF THE INVENTION

It is an object of this invention to provide apparatus for measuring certain important dimensions in shaft sealing means with annular sealing lips which is an improvement over known methods and avoids the problems associated with such methods.

It is a further object of the invention to provide apparatus on which the shaft sealing means can be mounted in a position similar to that occupied when such means are in operative position on a shaft and at which position measurements can be taken conveniently.

In general the apparatus, used in both embodiments of the invention, has a spindle with a circumferential groove into which the sealing lip of the shaft sealing ring snaps as the sealing ring is slipped over the spindle. This groove is so dimensioned that the sealing lip is carried in a position similar to that which the sealing lip would occupy on a shaft for which it is designed. After the sealing ring is thus positioned, desired measurement can be taken by gauges on the apparatus which can contact the sealing ring.

More specifically the spindle over which the sealing ring is slipped has a diameter which is larger than the inner diameter of the sealing edge of the sealing lip. Preferably the groove around the spindle is provided with a wedge-type cross section to facilitate the automatic engagement of the sealing lip edge in the groove. This permits a more accurate axial fixing of the seal on the spindle, in that the sealing edge will flip or snap into the groove, than would be possible with a mere axial abutment surface. It will be appreciated that, because of the exact fixing of the sealing lip edge, different deviations occurring at such seals, such as, for example, warping, noncircularity of the housing, obliqueness of the sealing lip, can be conveniently measured.

Further, the apparatus according to the present invention can be employed to measure axial as well as radial lengths at the lip seals. For example, in a first embodiment of the invention, means are provided for longitudinally measuring annular lip seals, particularly for measuring the effective distance of the spring, or the axial distance of the center line of the spring from the sealing edge. In this embodiment the measurements are taken with a mechanical gauge or sensor axially aligned with the spindle. If desired, a plurality of gauges can be distributed about the periphery of the spindle and this permits a calculation of an average value of the effective distance as taken by simultaneous measurements.

In a second embodiment of the invention, different means are provided for taking the measurement obtained in the first embodiment, and additional means are also provided for measuring the distance between the sealing edge and a side wall surface of the shaft sealing ring. In this second embodiment, the apparatus includes an axially guided lever which is provided with a notch in the form of a prismatic cut-out in the direction toward the spindle axis. Preferably the lever is pivotally mounted in a guide carriage. After the lever has been pushed over the spring cross section the prismatic notch of the lever engages on the spring. To measure the axial spacing between the spindle and the carriage bearing the lever, one or a plurality of measuring devices are provided. Thus, taking into consideration the otherwise fixed body dimensions, it is possible to obtain the effective spacing of the spring which can be read directly from the scale of the measuring device. In this case, also, a plurality of levers may be distributed over the periphery whose individual values can be utilized for an averaged indication and/or which provide information about the degree of obliqueness of the spring.

To avoid having to arrange a plurality of measuring points distributed over the periphery it is also possible to mount the spindle to be rotatable so that each point of the shaft seal periphery can be sensed consecutively in time and thus an optimum indication is obtained for the position of the sealing edge relative to the spring median plane as well as its deviations with respect to the periphery. With respect to either embodiment it is contemplated that instead of mechanical gauges electrically operating sensors can be employed and the measurements combined in a suitable device of known design to evaluate average values.

DESCRIPTION OF THE PREFERRED EMBODIMENTS

Figure 1:
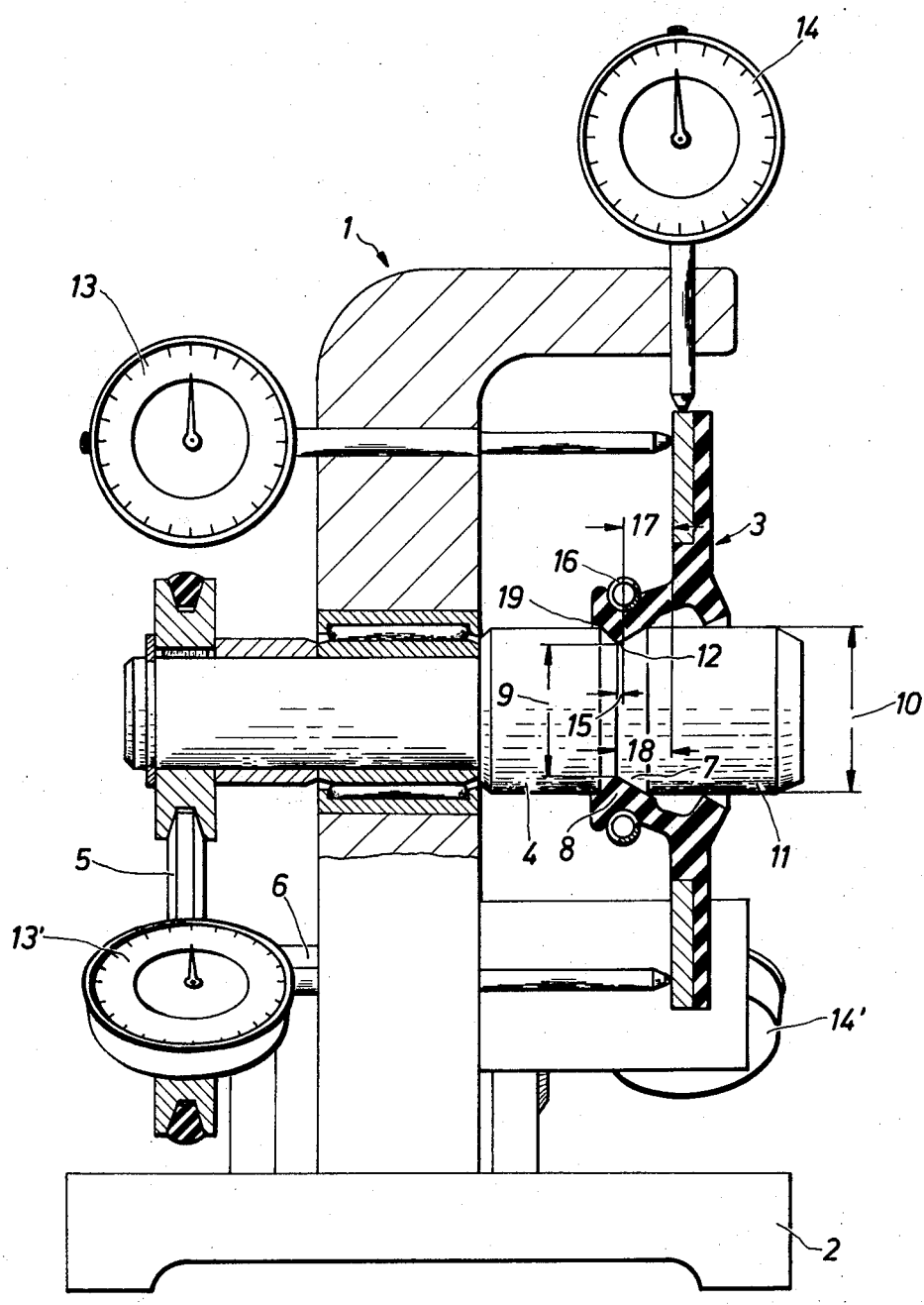
FIG. 1 is a side elevation view, partially in cross section, of one embodiment of the apparatus, according to the invention, and showing an annular lip seal mounted thereon.

Looking first at FIG. 1, it can be seen that the apparatus includes an angular stand, generally indicated at 1, which is permanently mounted on a base plate 2. To hold the annular lip seal, generally shown at 3, which is to be measured, a cylindrical spindle 4 is provided which is rotatably mounted in stand 1 in a transverse position. The spindle 4 can be driven in rotation via its one end by means of an electric motor 6 via a belt drive 5. The means used for rotatably mounting and driving the spindle 4, in and of themselves, comprise no part of the invention and will be known means.

The free end of spindle 4 is provided with a circumferential groove 7 which serves as the axial abutment for the annular lip seal. It should be observed that the groove cross-section is adapted to the wedge-shaped profile of the sealing lip 8. The diameter of the bottom of the groove 7, indicated at 9, is equal to the rated lip diameter so that measurements can be made as if the annular lip seal were installed on a shaft. The outer diameter of the spindle, shown at 10, is selected to be larger by a corresponding amount.

The annular lip seal 3 is slipped over the free end 11 of the spindle to a position where the seal will engage with its sealing lip 8 in the circumferential groove 7 and the sealing edge 12 is accurately fixed. The axial and radial length measurement of seal 3 is accomplished by means of gauges 13 and 14, respectively, which are permanently clamped into stand 1. Gauge 13 with the appropriate calibration shows the effective distance indicated at 15, of spring 16 from the sealing lip edge 12, since the distance between the face of the seal and the medial line of the spring 16, shown at 17, is known to be a fixed dimension and remains constant. On the other hand, the distance of the sealing edge 12 from the front face of the seal 3, indicated at 18, can be ascertained only after the pressed frontal contact surface 19 of seal 3 has been finished, as by grinding. Gauge 14 is designed to measure the radial length of the body portion of the annular lip seal 3 which is axially spaced from sealing edge 12.

Figure 2:
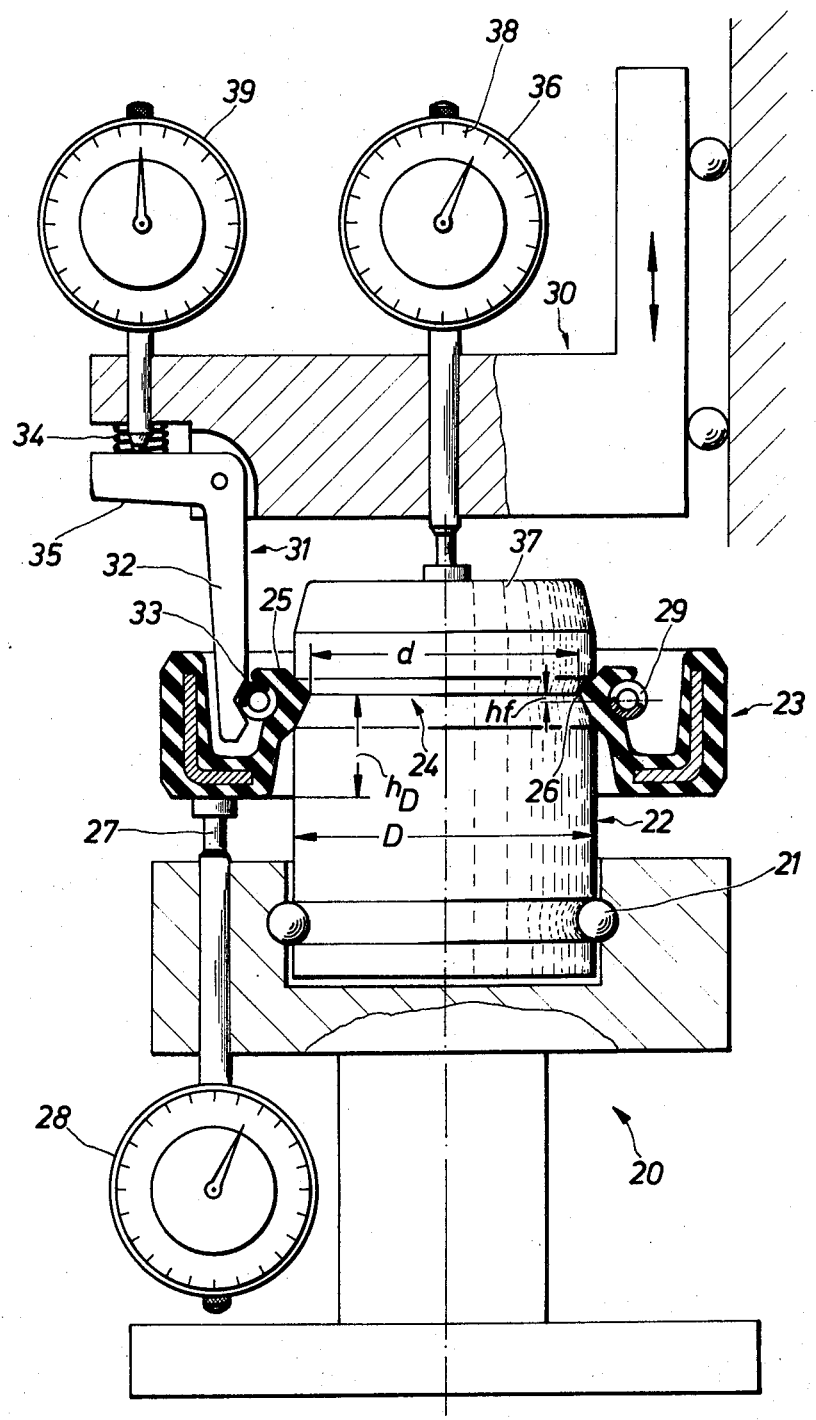
FIG. 2 is a side view, partially in cross-section, of a second embodiment of the apparatus, according to the invention, with an annular lip seal mounted thereon.

A second embodiment of the invention is shown in FIG. 2. As seen there, a base structure, generally indicated at 20 rotatably supports, in a known manner such as with ball bearings 21, an upright cylindrical spindle generally designated by reference number 22.

The free end of spindle 22 is provided with a taper over which the radial shaft sealing ring, generally indicated at 23, to be measured can be placed on spindle 22. The outer diameter D of spindle 22 is greater than the rated diameter of the shaft to be sealed with seal 23. In this embodiment, as in the first embodiment, a groove 24 is machined into spindle 22 and its triangular cross-section corresponds to the profile of the sealing lip 25 near the sealing lip edge 26. The diameter of the bottom of the groove is equal to the rated diameter of the shaft. When the seal is placed on spindle 22, the groove 24 serves to hold the sealing lip 25 so that the sealing ring 23 and particularly its sealing edge 26 is prevented from further axial displacement.

To measure the distance of the sealing edge $h_D$ (according to AWDR standards) a resilient sensor 27 is provided which is connected to a gauge 28 fastened in base structure 20. With the rotatable arrangement of spindle 22 it is possible to determine the dimension $h_D$ at each point of the circumference of the shaft sealing ring 23.

The effective spacing $hf$ of the spring 29 enclosing the sealing lip 25 with respect to the position of the sealing lip edge 26 is measured by a carriage, generally indicated at 30, which is guided above the base structure 20 and to which a lever, generally shown at 31, is rotatably fastened. The latter is provided at the end of its arm 32 with a notched recess 33.

Carriage 30 is moved in the direction toward the shaft sealing ring 23 until the recess 33 in lever 31 reaches the spring 29 of the shaft sealing ring 23 under the pressure of spring 34, acting on arm 35 of lever 31, and is arrested there — as illustrated — and prevented from further axial displacement. In this measuring position a gauge 36 connected with carriage 30 indicates the distance of carriage 30 from the frontal face 37 of the spindle 22 or with the appropriate consideration of the fixed dimensions of the device and design of the scale 38, gauge 36 directly shows the effective spacing $hf$.

Gauge 39 serves to monitor the position of lever 31 to 1 assure that the prismatic recess 33 is disposed centrically above spring 29.

While the present invention has been described in conjunction with shaft sealing rings in which the sealing lip is forced inwardly, as by a spring, the invention also relates to apparatuses which serve for the longitudinal measurement of lip seals with an outwardly acting sealing lip. Instead of the spindle an equivalent work piece receptacle (sleeve) is then provided.

Figure 3:
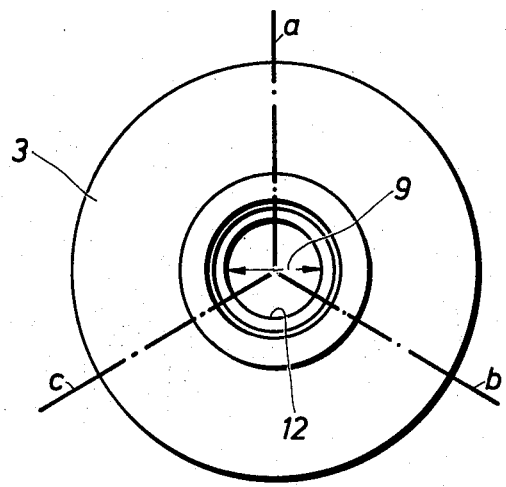
FIG. 3 is a schematical front view from the right-hand side of the sealing ring 3 shown in FIG. 1, illustrating the three measuring planes a of the gauges 13 and 14, b of the gauges 13' and 14', c of the — not visible — gauges 13'' and 14'', the three pairs of gauges being circumferentially disposed around the apparatus.
Figure 4:
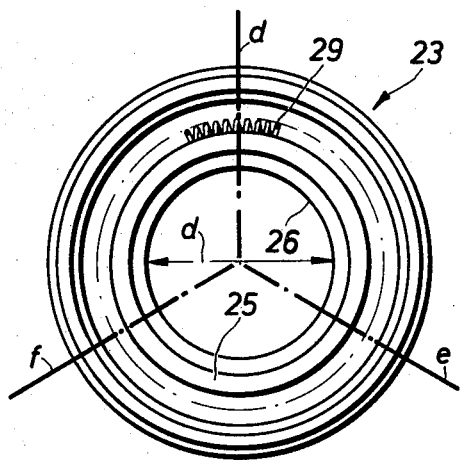
FIG. 4 is a schematical plan view of the sealing ring 23 shown in FIG. 2, illustrating, similar to FIG. 3, the three measuring planes d of the gauges 38 and 28, e of the gauges 38' and 28' (not shown) and f of the gauges 38'' and 28'', the three pairs of gauges being electrically operated, connected with evaluation and indication means and circumferentially disposed around the apparatus.

FIGS. 3 and 4 are schematical illustrations of two further embodiments of the invention according to FIGS. 1 and 2, in each of which three pairs of electrically operated gauges, connected with evaluation and indicating means, are circumferentially disposed around the first and second support structures of the apparatus to simultaneously contact the radial wall and the surface of the sealing rings to be measured. In the embodiment of the invention shown in FIG. 3, there are illustrated the three measuring planes $a$, $b$ and $c$ for two gauges each, the plane $a$ being that of the gauges 13 and 14, the plane $b$ that of the gauges 13' and 14' as shown in FIG. 1, while the plane $c$ is that of two gauges 13'' and 14'' not visible in FIG. 1 because they are arranged in the distance each of 120° to the gauge pairs 13 and 14 or 13' and 14' respectively.

Similarly, the embodiment of the invention as shown in FIG. 4 explains an apparatus illustrated in more detail in FIG. 2 with the measuring plane $d$ of the gauges 28 and 39, while the plane $e$ for two gauges 28' and 39' as well as the plane $f$ for two gauges 28'' and 39'' are arranged at an angle of 120° each to the plane $d$, so the gauges 28', 39' and 28'', 39'' are not visible in FIG. 2.

It will be understood that the above description of the present invention is susceptible to various modifications, changes and adaptations, and the same are intended to be comprehended within the meaning and range of equivalents of the appended claims.

I claim:

1. Apparatus for measuring axial and radial distances in an annular seal having an annular sealing lip with a surrounding annular spring and a sealing edge adapted to contact the peripheral surface of a shaft, comprising in combination:
  a. A support structure;
  b. A spindle rotatably supported in said support structure, said spindle having a circumferential groove therein which is designed to receive and hold an annular sealing lip of an annular seal which can be slipped on and off said spindle, said groove conforming to the shape of the annular sealing lip with the diameter of the bottom of said groove equal to the diameter of the shaft on which the seal is designed for use; and
  c. Measuring means supported adjacent said spindle by said support structure, said measuring means including sensor means adapted to contact face surfaces on said spindle and on the seal when disposed on said spindle, said measuring means being calibrated to indicate distance measurements axially of the seal from the sealing edge thereof and distances measured radially of a body portion of the seal axially spaced from the sealing edge.

2. Apparatus as defined in claim 1, wherein said circumferential groove is wedge-shaped in cross-sectional profile.

3. Apparatus as defined in claim 1, wherein said sensor means include a first sensor means on said support structure arranged to contact a radial wall of such body portion and a second sensor means on said support structure arranged to contact the outer peripheral wall of such body portion.

4. Apparatus as defined in claim 1, wherein said measuring means are mechanical gauges.

5. Apparatus as defined in claim 2 wherein said measuring means are supported on said support structure and further comprising guide means in fixed relation to said support structure and a second support structure mounted on said guide means for movement axially of said spindle.

6. Apparatus as defined in claim 5, wherein said sensor means includes a first sensor means on said support structure for contacting a surface on the seal which is axially spaced from the sealing lip and a second sensor means on said second support structure contacting the end wall of the free end of said spindle.

7. Apparatus as defined in claim 5, wherein said measuring means are mechanical gauges.

8. Apparatus as defined in claim 5, wherein a lever is pivotally mounted on said second support structure, said lever having at one end a notched recess for encompassing the annular spring surrounding the annular sealing lip of the seal, and means on said second support structure resiliently urging said lever against the annular spring so that the sealing lip of the seal is held within said circumferential groove in said spindle.

9. Apparatus as defined in claim 6, wherein a plurality 1 of first sensor means are circumferentially disposed on said support structure to simultaneously contact the surface on the seal.

10. Apparatus as defined in claim 7, wherein said measuring means includes a gauge mounted on said second support structure to contact said lever and monitor the position of said lever.

11. Apparatus as defined in claim 3, wherein a plurality of said first sensor means are circumferentially disposed around said support structure to simultaneously contact the radial wall.

* * * * *

UNITED STATES PATENT OFFICE
CERTIFICATE OF CORRECTION

Patent No. 3,708,885    Dated January 9th, 1973

Inventor(s) Karl Christ

It is certified that error appears in the above-identified patent and that said Letters Patent are hereby corrected as shown below:

On the title page, after the Abstract, change "11 Claims, 3 Drawing Figures" to --11 Claims, 4 Drawing Figures--. Column 1, line 36, change "plexiglas" to --Plexiglas--. Column 4, line 62, after "to" delete "1". Column 6, line 41, before "of" delete "1".

Signed and sealed this 3rd day of July 1973.

(SEAL)
Attest:

EDWARD M. FLETCHER, JR.          Rene Tegtmeyer
Attesting Officer                Acting Commissioner of Patents